United States Patent [19]

Ogata et al.

[11] Patent Number: 4,572,823

[45] Date of Patent: Feb. 25, 1986

[54] PROCESS FOR RHENIUM RECOVERY

[75] Inventors: Takashi Ogata; Hiroshi Tasaki; Shunichi Kasai, all of Toda, Japan

[73] Assignee: Nihon Kogyo Kabushiki Kaisha, Tokyo, Japan

[21] Appl. No.: 607,835

[22] Filed: May 7, 1984

[30] Foreign Application Priority Data

May 13, 1983 [JP] Japan .................................. 58-82576

[51] Int. Cl.$^4$ .............................................. C01G 47/00
[52] U.S. Cl. .................................. 423/49; 75/101 BE
[58] Field of Search ....................... 423/49; 75/101 BE

[56] References Cited

U.S. PATENT DOCUMENTS

| | | | |
|---|---|---|---|
| 2,809,092 | 10/1957 | Zimmerley et al. | 423/49 |
| 2,876,065 | 3/1959 | Zimmerley et al. | 423/49 |
| 2,945,743 | 7/1960 | Zimmerley et al. | 423/49 |
| 2,972,531 | 2/1961 | Zimmerley et al. | 75/101 BE |
| 3,558,268 | 1/1971 | Prater et al. | 423/49 |
| 3,672,874 | 6/1972 | Wiley | 75/101 BE |

FOREIGN PATENT DOCUMENTS 46-16249  5/1971  Japan .............................. 75/101 BE

OTHER PUBLICATIONS

Fisher et al., "Analitical Chem.", vol. 24, 1952, pp. 1100–1106.

*Primary Examiner*—Herbert T. Carter
*Attorney, Agent, or Firm*—Seidel, Gonda, Goldhammer & Abbott

[57] ABSTRACT

A process for rhenium recovery by the use of an anion exchange resin comprises eluting rhenium from the rhenium-adsorbed anion exchange resin with a hydrochloric acid solution containing a metal chloride. Preferred metal chloride is that of copper, cadmium, or zinc.

2 Claims, 1 Drawing Figure

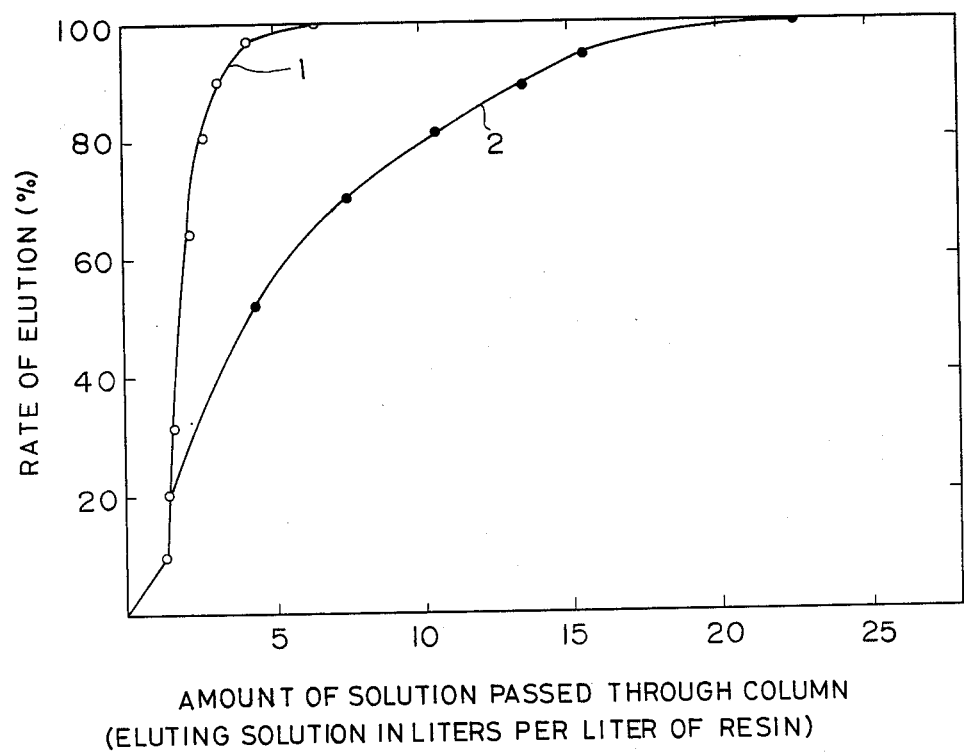

PROCESS FOR RHENIUM RECOVERY

BACKGROUND OF THE INVENTION

This invention relates to recovery of rhenium, and more specifically to a process for recovering rhenium with the use of an anion exchange resin.

Rhenium, a rare metal that concomitantly occurs in slight amounts in molybdenum ores, i.e., molybdenite, and copper ores, is an important metallic element to be added to catalysts and the like.

One way known in the art for the recovery of rhenium consists of dissolving a raw material containing rhenium heptoxide, $Re_2O_7$, into an aqueous solution and then recovering rhenium by the anion exchange resin method.

In the practice of anion exchange process described above, there has been a need for easily eluting the rhenium securely adsorbed on to the anion exchanger, without destroying the exchanger to recover rhenium.

SUMMARY OF THE INVENTION

The present invention, in order to meet the above requirement, provides a process for recovering rhenium by the use of an anion exchange resin, wherein rhenium is eluted from the resin with a hydrochloric acid solution containing a metal chloride.

Preferred metal chloride is that of copper, cadmium, or zinc.

BRIEF DESCRIPTION OF THE DRAWING

Drawing is a graph showing measured rates of elution attained by passing an eluting solution through a rhenium-adsorbed anion exchange resin column, the curve 1 representing the process of the invention and the curve 2 is a comparative example.

DETAILED DESCRIPTION OF THE INVENTION

The anion exchange resin to be employed in the present invention is a commercially available one, e.g, marketed under the trade designations "Diaion SA20A", "Diaion PA316", or "Diaion PA408" (by Mitsubishi Chemical Industries, Ltd.). These resins are strongly basic alkylamine anion exchange resins.

Diaion SA20A is a gel type resin in which a high molecular substrate is crosslinked with divinylbenzene and contains many micropores.

Diaion PA316 and PA408 are porous type resins in which a large number of micropores are developed by a synthetic process.

As a rhenium-containing solution comes into contact with such an anion exchange resin, rhenium is securely adsorbed by the resin at a rate from two to several ten grams per liter of the resin.

The securely adsorbed rhenium is eluted with a hydrochloric acid solution containing one or more metal chlorides, especially of copper, cadmium, and zinc. In this way rhenium can be recovered in a high yield. Specifically, the present invention prefers the chlorides of zinc, cadmium, and copper to the chlorides of potassium, iron, sodium, magnesium, calcium and the like in view of the results of comparative test conducted in the following manner.

Ten-milliliter portions of an anion exchange resin (Diaion SA20A") that had adsorbed 7.9 g of rhenium per liter of the resin volume were placed into beakers together with 100 ml of a 6N hydrochloric acid solution and 50 g/l each of zinc, copper, cadmium, or iron chloride. In a temperature controlled bath kept at 30° C., the contents in the beakers were allowed to contact with stirring at a rate of 300 times a minute for 4 hours.

The rates of elution achieved with the solutions containing the chlorides of zinc, cadmium, copper, and iron were, respectively, 46.1%, 43.0%, 39.3%, and 32.1%.

This clearly indicates that the addition of the zinc, cadmium, or copper chloride brings a higher rate of elution than with the iron chloride.

As regards the concentration of hydrochloric acid in the solution, 3 to 9 normal (N) are satisfactory. Beyond 9N, the solution evolves a hydrochloric acid mist and becomes too strongly acidic for industrial uses.

When the elution is to be followed by a sulfur treatment for refining purpose, the metal chloride is desired to be that of zinc, because zinc simplifies the refining operation.

The elution solution, in an amount 3 to 9 times as much as the volume of the resin, will effect the elution of rhenium almost completely. The elution is carried out by passing the eluting solution through the column on to which rhenium has been adsorbed, from the top downward.

Usually, the eluting solution is passed at a rate of 1.2 ml/min.cm$^2$. The reaction temperature for elution is desired to be high, insofar as it is not high enough to cause evolution of a hydrochloric acid mist. Ordinary temperatures may also be employed.

The present invention, when practiced in the manner described above, will present the following advantages:

(1) Elution of rhenium from the anion exchange resin is performed with utmost ease by the use of an eluting solution acidified with hydrochloric acid and which contains a metal chloride, especially the metal ion of zinc, cadmium, or copper.

(2) The eluting solution according to the invention, accomplishes nearly 100% elution in an amount one-fourth the amount usually required of the solution of hydrochloric acid only.

(3) While eluting solutions with high hydrochloric acid concentrations above 9N are difficult to handle for industrialscale operations, the process of the invention does not require such high acidity with hydrochloric acid in carrying out the elution satisfactorily.

(4) Especially where the eluate is to be purified by a sulfur treatment, the use of an eluting solution containing zinc alone, in addition to hydrochloric acid, is beneficial in that a rhenium solution free from impurities will result from the after-treatment.

EXAMPLE 1

A column having 18 mm diameter and 780 mm height was charged with anion exchange resins ("Diaion PA408") that had adsorbed 3.8 g of rhenium per liter of the resin volume. A 6N hydrochloric acid solution containing 100 g of zinc chloride per liter was passed as an eluting solution through the column at a rate of 3.3 ml/min. Attached FIGURE shows the results.

The curve 1 represents the results according to the invention, and the curve 2 is the results of a comparative example conducted under the same conditions but with a 6N hydrochloric acid solution only.

With an amount one-fourth that of the latter, the eluting solution of the invention accomplished almost 100% elution.

What is claimed is:

1. A process for rhenium recovery by the use of an anion exchange resin, characterized in that rhenium is eluted from the rhenium-adsorbed anion exchange resin with a hydrochloric acid solution containing a metal chloride selected from the group consisting of cadmium chloride and zinc chloride.

2. A process for rhenium recovery by the use of an anion exchange resin, characterized in that rhenium is eluted from the rhenium-adsorbed anion exchange resin with a hydrochloric acid solution containing a metal chloride, said metal chloride is zinc chloride.

* * * * *